(12) United States Patent
Allen et al.

(10) Patent No.: US 10,740,570 B2
(45) Date of Patent: *Aug. 11, 2020

(54) CONTEXTUAL ANALOGY REPRESENTATION

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,142

(22) Filed: Apr. 16, 2019

(65) Prior Publication Data

US 2019/0243895 A1 Aug. 8, 2019

Related U.S. Application Data

(63) Continuation of application No. 15/365,114, filed on Nov. 30, 2016, now Pat. No. 10,325,024.

(51) Int. Cl.
*G06F 40/35* (2020.01)
*G06N 20/00* (2019.01)
(Continued)

(52) U.S. Cl.
CPC .......... *G06F 40/35* (2020.01); *G06F 40/295* (2020.01); *G06N 20/00* (2019.01); *G06N 3/006* (2013.01)

(58) Field of Classification Search
CPC ............. G06F 17/30684; G06F 17/271; G06F 17/30654; G06F 17/2881; G06F 40/35;
(Continued)

(56) References Cited

U.S. PATENT DOCUMENTS 6,523,026 B1 * 2/2003 Gillis .................. G06F 16/3332
8,515,888 B2    8/2013 Ventilla et al.
(Continued)

OTHER PUBLICATIONS

Ferrucci et al., Building Watson: An Overview of the DeepQA Project, Association for the Advancement of Artificial Intelligence, AI Magazine, Fall 2010, pp. 59-79.
(Continued)

*Primary Examiner* — Angela A Armstrong
(74) *Attorney, Agent, or Firm* — Lieberman & Brandsdorfer, LLC (57) ABSTRACT

Embodiments relate to an intelligent computer platform to provide a contextual analogy response. The aspect of providing a contextual analogy response includes denoting an analogy phrase within a communication. An anaphora within the analogy phrase is detected and a set of sentences are parsed into grammatical components wherein the grammatical type for each parsed component is identified. A sentence is created with the detected anaphora and an action term from the analogy phrase. The set of sentences and the analogy phrase are matched with the identified components that are assigned to a solved analogy association. A related contextual response is attached to the solved analogy association to generate the outputted analogy response.

15 Claims, 7 Drawing Sheets

(51) Int. Cl.
*G06F 40/295* (2020.01)
*G06N 3/00* (2006.01)

(58) Field of Classification Search
CPC ...... G06F 40/295; G06N 99/005; G06N 5/02; G06N 3/006; G06N 20/00
See application file for complete search history.

(56) References Cited

U.S. PATENT DOCUMENTS

| 8,935,192 | B1 | 1/2015 | Ventilla et al. | |
|---|---|---|---|---|
| 9,015,030 | B2 | 4/2015 | Hunter et al. | |
| 9,015,031 | B2 | 4/2015 | Ferrucci et al. | |
| 10,133,736 | B2 * | 11/2018 | Allen | G06F 17/279 |
| 10,325,025 | B2 * | 6/2019 | Allen | G06F 17/279 |
| 2008/0275694 | A1 | 11/2008 | Varone | |
| 2012/0016661 | A1 | 1/2012 | Pinkas | |
| 2014/0012798 | A1 | 1/2014 | Visel | |
| 2015/0278195 | A1 | 10/2015 | Yang et al. | |
| 2017/0206897 | A1 | 7/2017 | Jiang et al. | |

OTHER PUBLICATIONS

Gliozzo et al., Predicting Lexical Answer Types in Open Domain QA, IGI Global, 2012.
Lally et al., Question Analysis: How Watson Reads a Clue, IBM J. Res. & Dev., vol. 56, No. 3/4, Paper 2, May/Jul. 2012.
Anonymous, System and Method for Communication Improvement Based on Interaction Analysis, An IP.com Prior Art Database Technical Disclosure, Aug. 12, 2014.
Allen, Robert B., Connectionist Language Users, Connection Science, vol. 2, No. 4, pp. 279-211, 1990.
List of IBM Patents or Applications Treated as Related, Apr. 2019.

* cited by examiner

CONTEXTUAL ANALOGY REPRESENTATION

CROSS REFERENCE TO RELATED APPLICATION(S)

This application is a continuation patent application claiming the benefit of the filing date of U.S. patent application Ser. No. 15/365,114 filed on Nov. 30, 2016 and titled "Contextual Analogy Response", now pending, the entire contents of which are hereby incorporated by reference.

BACKGROUND

The present embodiments relate to natural language processing. More specifically, the embodiments relate to recognizing and resolving the meaning of an analogical pattern.

In the field of artificially intelligent computer systems, natural language systems (such as the IBM Watson® artificially intelligent computer system or and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Analogies are language constructs which enable knowledge transfer from one situation or context to another based on a conceptual similarity there between, and provide powerful cognitive mechanisms or tools that can be used to explain something that is unknown in terms of a related concept that is known to someone. At the core of analogical reasoning lies the concept of similarity. However, the process of understanding an analogy requires reasoning from a relational perspective that can be challenging due to complexities of language structure and use of idioms and analogies. In addition, automated systems and other natural language systems which come across an analogy in a question or answer corpus will also have a difficult time with identifying and understanding analogies. As a result, existing solutions for efficiently identifying and understanding analogies for training and/or use by a natural language processing system are extremely difficult at a practical level.

SUMMARY

The embodiments include a system, computer program product, and method for deciphering a phrase present in an analogical pattern format.

In one aspect, a system is provided for use with an intelligent computer platform to provide a contextual analogy response. A processing unit is operatively coupled to memory and is in communication with the artificial intelligence platform. A tool, in communication with the processing unit, is activated by the artificial intelligence platform and employed to provide a contextual analogy response. More specifically, the tool denotes an analogy phrase within a communication. An analogy manager parses a set of sentences to detect an anaphora within the analogy phrase. The analogy manger creates a sentence with the detected anaphora and an action term from the analogy phrase. The analogy manager parses the analogy phrase and the set of sentences into grammatical components wherein the grammatical type for each parsed component is identified. A representation generator matches the set of sentences and the analogy phrase with the identified components. The matched grammatical components are assigned to a solved analogy association. The representation generator selects a contextual response related to the analogy phrase and the resolved anaphora. The contextual response is attached to the solved analogy association. The analogy response is generated and then communicated as output.

In another aspect, a computer program device is provided for use with an intelligent computer platform for providing a contextual analogy response. The device has program code embodied therewith. The program code is executable by a processing unit to denote an analogy phrase within a communication. The program code to parse a set of sentences to detect an anaphora within the analogy phrase. A sentence is created with the detected anaphora and an action term from the analogy phrase. The program code to parse the analogy phrase and the set of sentences into grammatical components wherein the grammatical type for each parsed component is identified. The program code to further match the set of sentences and the analogy phrase with the identified components. The matched grammatical components are assigned to a solved analogy association. A contextual response related to the analogy phrase and the resolved anaphora is selected. The contextual response is attached to the solved analogy association. The program code to generate the analogy response and communicated as output.

In yet another aspect, a method is provided for use by an intelligent computer platform for providing a contextual analogy response. The method commences by denoting an analogy phrase within a communication. A set of sentences are parsed to detect an anaphora within the analogy phrase. A sentence is created with the detected anaphora and an action term from the analogy phrase. The analogy phrase and the set of sentences are parsed into grammatical components wherein the grammatical type for each parsed component is identified. The set of sentences and the analogy phrase are matched with the identified components. The matched grammatical components are assigned to a solved analogy association. A contextual response related to the analogy phrase and the resolved anaphora is selected. The contextual response is attached to the solved analogy association. The analogy response is generated and then communicated as output.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
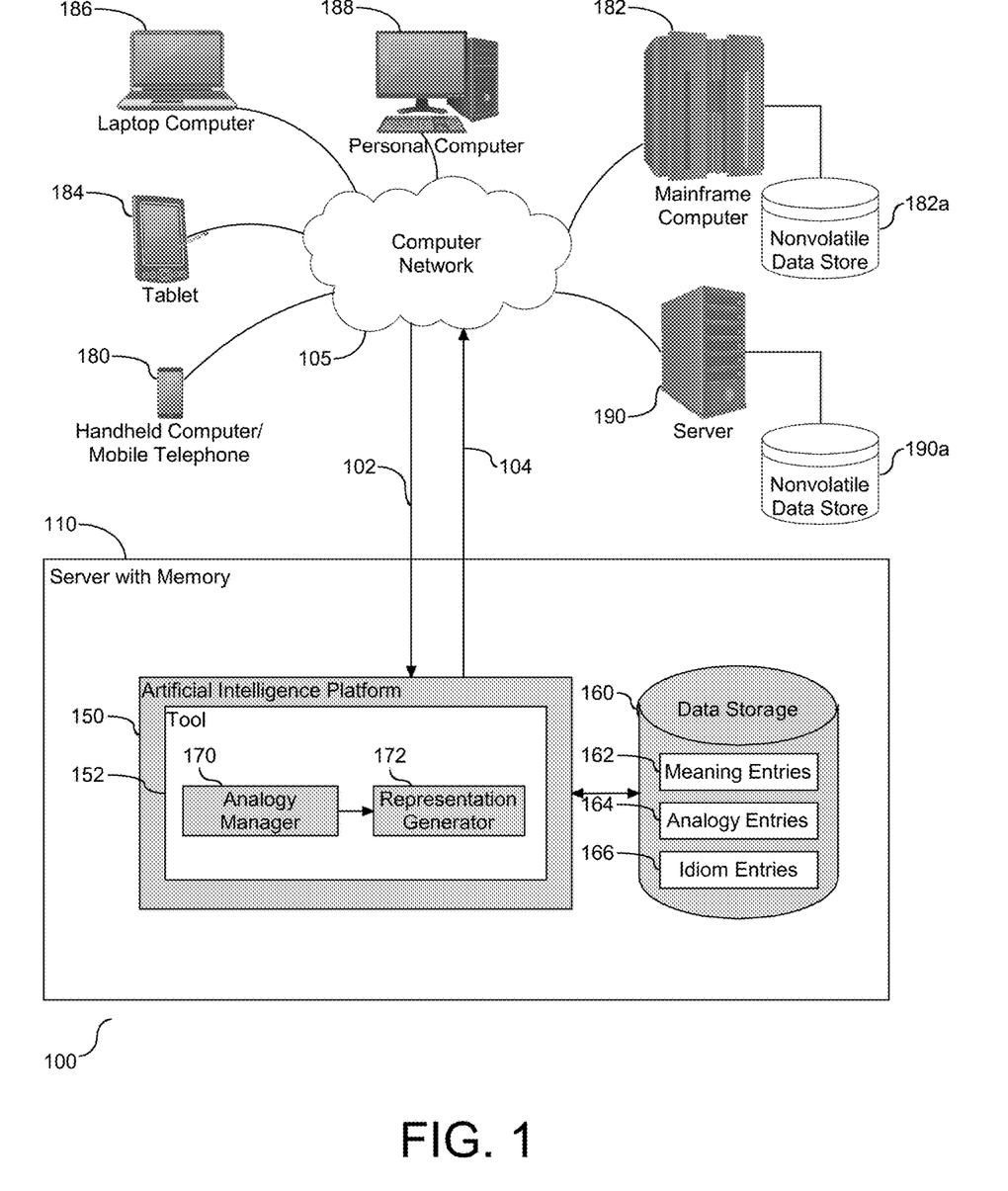
FIG. 1 depicts a system diagram illustrating a content and response system connected in a network environment that uses an analogy manager to identify and analyze analogies and a representation generator to construct a response.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit in communication with memory across a bus. The server (110) is shown with an artificial intelligence platform (150) for natural language processing over the network (105) from one or more of the computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable analogical pattern recognition and resolution for one or more content users. Other embodiments of the server (110) may be used with components, systems, sub-systems, and/or devices other than those that are depicted herein.

The artificial intelligence platform (150) is shown herein configured to receive input from various sources. For example, artificial intelligence platform (150) may receive input from the network (105) and a data source (160), also referred to herein as a corpus. As shown, the data source (160) is configured with meaning entries (162), analogy entries (164), and idiom entries (166). In one embodiment, the data source (160) may be configured with other or additional sources of input, and as such, the sources of input shown and described herein should not be considered limiting. Similarly, in one embodiment, the data source (160) includes structured, semi-structured, and/or unstructured content in a plurality of documents that are contained in one or more databases or corpus. The various computing devices (180), (182), (184), (186), and (188) in communication with the network (105) may include access points for content creators and content users. Some of the computing devices may include devices for a database storing the corpus of data as the body of information used by the artificial intelligence platform (150) to generate an analogical pattern outcome (104). The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in documents, network accessible sources and/or structured data sources. In this manner, some processes populate the artificial intelligence platform (150), with the artificial intelligence platform (150) also including input interfaces to receive requests and respond accordingly.

As shown, content may be in the form of one or more electronic documents or data source entries (162)-(166) for use as part of the corpus (160) of data with the artificial intelligence platform (150). The corpus (160) may include any structured and unstructured documents, including but not limited to any file, text, article, or source of data (e.g. scholarly articles, dictionary, definitions, encyclopedia references, and the like) for use by the artificial intelligence platform (150). Content users may access the artificial intelligence platform (150) via a network connection or an internet connection to the network (105), and may submit natural language input to the artificial intelligence platform (150) that may effectively determine a meaning of an analogy present in one or more submissions by searching content in the corpus of data. As further described below, when a process evaluates a document or a section of a document for semantic content, the process can use a variety of conventions to query the document or document section from the artificial intelligence platform (150). Semantic content is content based on the relation between signifiers, such as words, phrases, signs, and symbols, and what they stand for, their denotations, or connotation. In other words, semantic content is content that interprets an expression, which in one embodiment may employ Natural Language (NL) processing. In one embodiment, the process sends well-formed content (102), e.g. natural language text, to the artificial intelligence platform (150), so that the content (102) may be interpreted and the artificial intelligence platform (150) may provide a response in the form of one or more outcomes (104). In one embodiment, the artificial intelligence platform (150) may provide a response in the form of a ranked list of outcomes (104).

In some illustrative embodiments, server (110) may be the IBM Watson® system available from International Business Machines Corporation of Armonk, N.Y., which is augmented with the mechanisms of the illustrative embodiments described hereafter. The IBM Watson® knowledge manager system may receive input content (102) which it then parses to extract features of the content (102) that in turn are applied to the corpus of data (160). Based on application of the content (102) to the corpus of data, a set of candidate outcomes are generated by looking across the corpus of data for portions of the corpus of data that have some potential for containing a matching analogical pattern to the submitted content (102).

In particular, received content (102) may be processed by the IBM Watson® server (110) which performs analysis on the language of the input content (102) and the language used in each of the portions of data found during application of the content using a variety of reasoning algorithms. There may be hundreds or even thousands of reasoning algorithms applied, each of which performs different analysis, e.g., comparisons, and generates a score. For example, some reasoning algorithms may look at matching of terms and synonyms within the language of the input content (102) and the found portions of the corpus of data. Other reasoning algorithms may look at temporal or spatial features in the language, while others may evaluate the source of the portion of the corpus of data and evaluate its veracity.

Scores obtained from the various reasoning algorithms indicate the extent to which the potential response (104) is inferred by the input content (102) based on a specific area of focus of that reasoning algorithm. Each resulting score is weighted against a statistical model. The statistical model captures how well the reasoning algorithm performed at establishing the inference between two similar passages for a particular domain during the training period of the IBM Watson® system. The statistical model may be used to summarize a level of confidence that the IBM Watson® system has regarding the evidence that the potential response (104), i.e., candidate analogy, is inferred by the submitted content (102) question. This process may be repeated for each of the candidate outcomes (104) until the IBM Watson® system (110) identifies candidate outcomes that surface as being significantly stronger than others and thus, generates a final analogy outcome (104), or ranked set of outcomes, for the input content (102).

To process natural language, the system (110) utilizes a tool (152) which leverages the functionality of an analogy manager (170), shown embedded in the tool (152), with the analogy manager (170) configured to identify and analyze analogies by detecting and categorizing analogical patterns, generating potential meanings for each detected analogical pattern from characteristic metadata for terms in the analogical pattern, and identifying a meaning or a potential meaning for the detected analogical pattern by analyzing and scoring the meaning(s) based on the characteristic metadata and terms in the detected analogical pattern. Though shown as being embodied in or integrated with the server (110), the tool (152) and/or analogy manager (170) may be implemented in a separate computing system (e.g., 190) that is connected across network (105) to the server (110). Wherever embodied, the analogy manager (170) functions to detect and categorize analogical patterns, generate potential meanings for each detected analogical pattern, and identify a best meaning for the detected analogical pattern by analyzing and scoring the potential meanings based on the characteristic metadata and terms in the detected analogical pattern.

In selected example embodiments, the analogy manager (170) may be configured to apply NL processing to detect an analogy in a source text segment by mapping parsed terms and phrases from the sentence into one or more potential analogical patterns. As described in more detail with reference to FIGS. 3 and 4, the analogy manager (170) may perform a sentence structure analysis, with the analysis entailing a parse of the subject sentence(s) and the parse to denote terms identifying one or more analogical patterns having a source analogic (e.g., source term type and analogical phrase) connected by a comparator to a target analogic (e.g., target analogical phrase and characteristic term).

For example, the information handling system may use a Slot Grammar Logic (SGL) parser to perform parse of a source sentence to detect one or more specified analogical patterns (e.g., "[noun] [verb] like [x] as a [y]" or variations thereof, such as "[noun] [verb phrase] [comparator] [adjective] [noun phrase]"). The analogy manager (170) may also be configured to apply one or more learning methods to match a detected analogical pattern to known patterns to decide and categorize the source sentence as an analogy.

As shown, the analogy manager (170) supports resolution of the analogical pattern. The analogy manager (170) functions to resolve the anaphora, and in one embodiment resolve the relationship of the anaphora to the noun. The analogy manager (170) also functions to identify the relationship or connection of keywords in the parsed sentence, and to apply analytic analysis to refine specific terms in the detected analogical pattern for entity resolution, ontology, and other term characteristics or metadata (e.g., by using the definition of the terms and ontology) for use in determining the outcome or meaning of the analogy. A definition of a term or phrase, as used herein, is an explanation of the meaning of the term or phrase.

To evaluate which of the potential meanings best corresponds to the detected analogical pattern, the analogy manager (170) may be configured to use the definitions of the terms and ontology in the analogical pattern to determine and score potential meanings of the analogy based on the options from the term characteristic alignments and their agreements when combined. The analogy manager (170) may apply a learning method for previously similar analogies or noun-verb relationship in a similar pattern, along with definition extraction for the verb in relation to the noun/object characteristics and the comparator/idiomatic used. The meaning of the detected analogical pattern may be deduced by the analogy manager (170) as a combination of the source analogic characteristic and metadata with the target analogic outcome, and then presented with the evidence from the characteristics and meaning and any corpus references that are used to contribute to the determination.

The analogy manager (170) generates an idiomatic structure. A representation generator (172) utilizes the grammatical components and grammatical structure to construct an analogy representation. The grammatical components may be derived from the data source or corpus (160) or may be derived from other sources via the network (105). The representation generator (172) retrieves a representation template (not shown), which in one embodiment is present in the data source (160) or another source in communication with the network (105). More specifically, the generator (172) populates the representation template with the identified entity, the meaning of the analogy, the identified anaphora terms, and the response statement retrieved from the analogy manager (170). The tool (152), via its communication with both the analogy manager (170) and the representation generator (172), is able to retrieve and convey information and data to and from the analogy manager (170) and representation generator (172).

Types of information handling systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems. An illustrative example of an information handling system showing an exemplary processor and various components commonly accessed by the processor is shown and described in FIG. 2.

Figure 2:
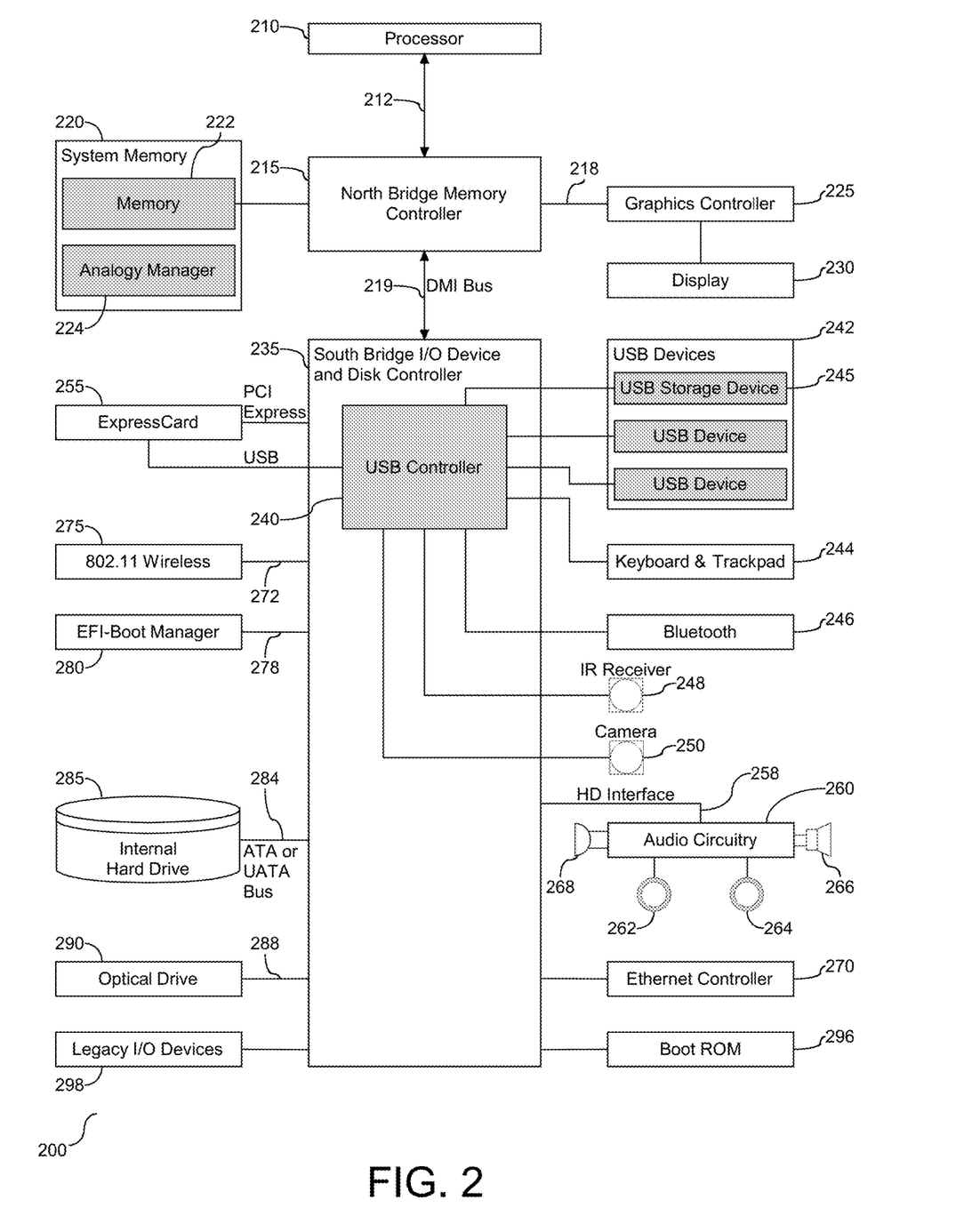
FIG. 2 depicts a block diagram of a processor and components of an information handling system such as those shown in FIG. 1.

Referring to FIG. 2, a block diagram (200) is provided illustrating an artificial intelligence platform, also referred to as an information handling system. As shown, one or more processors (210) are coupled to processor interface bus (212), which connects processors (210) to Northbridge (215), which is also known as the Memory Controller Hub (MCH). Northbridge (215) connects to system memory (220) and provides a means for processor(s) (210) to access the system memory (220). In the system memory (220), a variety of programs may be stored in one or more memory devices (222), including i.e. an analogy manager (224) and the representation generator (shown in FIG. 1), which may be invoked to detect an analogy by parsing or breaking a sentence into a discrete analogical pattern and then use definitions of the terms in the analogical pattern(s) to determine the potential meanings of the analogy. Graphics controller (225) also connects to Northbridge (215). In one embodiment, PCI Express bus (218) connects Northbridge (215) to graphics controller (225). Graphics controller (225) connects to display device (230), such as a computer monitor.

Northbridge (215) and Southbridge (235) connect to each other using bus (219). In one embodiment, the bus is a Direct Media Interface (DMI) bus that transfers data at high speeds in each direction between Northbridge (215) and Southbridge (235). In another embodiment, a Peripheral Component Interconnect (PCI) bus connects the Northbridge and the Southbridge. Southbridge (235), also known as the I/O Controller Hub (ICH) is a chip that generally implements capabilities that operate at slower speeds than the capabilities provided by the Northbridge (215). Southbridge (235) typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM (296) and "legacy" I/O devices (298) (using a "super I/O" chip). The "legacy" I/O devices (298) can include, for example, serial and parallel ports, keyboard, mouse, and/or a floppy disk controller. Other components often included in Southbridge (235) include a Direct Memory Access (DMA) controller, a Programmable Interrupt Controller (PIC), and a storage device controller, which connects Southbridge (235) to nonvolatile storage device (285), such as a hard disk drive, using bus (284).

ExpressCard (255) is a slot that connects hot-pluggable devices to the information handling system. ExpressCard (255) supports both PCI Express and USB connectivity as it connects to Southbridge (235) using both the Universal Serial Bus (USB) the PCI Express bus. Southbridge (235) includes USB Controller (240) that provides USB connectivity to devices that connect to the USB. These devices include webcam (camera) (250), infrared (IR) receiver (248), keyboard and trackpad (244), and Bluetooth device (246), which provides for wireless personal area networks (PANs). USB Controller (240) also provides USB connectivity to other miscellaneous USB connected devices (242), such as a mouse, removable nonvolatile storage device (245), modems, network cards, ISDN connectors, fax, printers, USB hubs, and many other types of USB connected devices. While removable nonvolatile storage device (245) is shown as a USB-connected device, removable nonvolatile storage device (245) could be connected using a different interface, such as a Firewire interface, etc.

Wireless Local Area Network (LAN) device (275) connects to Southbridge (235) via the PCI or PCI Express bus (272). LAN device (275) typically implements one of the IEEE 802.11 standards for over-the-air modulation techniques to wireless communicate between information handling system (200) and another computer system or device. Extensible Firmware Interface (EFI) manager (280) connects to Southbridge (235) via Serial Peripheral Interface (SPI) bus (278) and is used to interface between an operating system and platform firmware. Optical storage device (290) connects to Southbridge (235) using Serial ATA (SATA) bus (288). Serial ATA adapters and devices communicate over a high-speed serial link. The Serial ATA bus also connects Southbridge (235) to other forms of storage devices, such as hard disk drives. Audio circuitry (260), such as a sound card, connects to Southbridge (235) via bus (258). Audio circuitry (260) also provides functionality such as audio line-in and optical digital audio in port (262), optical digital output and headphone jack (264), internal speakers (266), and internal microphone (268). Ethernet controller (270) connects to Southbridge (235) using a bus, such as the PCI or PCI Express bus. Ethernet controller (270) connects information handling system (200) to a computer network, such as a Local Area Network (LAN), the Internet, and other public and private computer networks.

While FIG. 2 shows one information handling system (200), an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
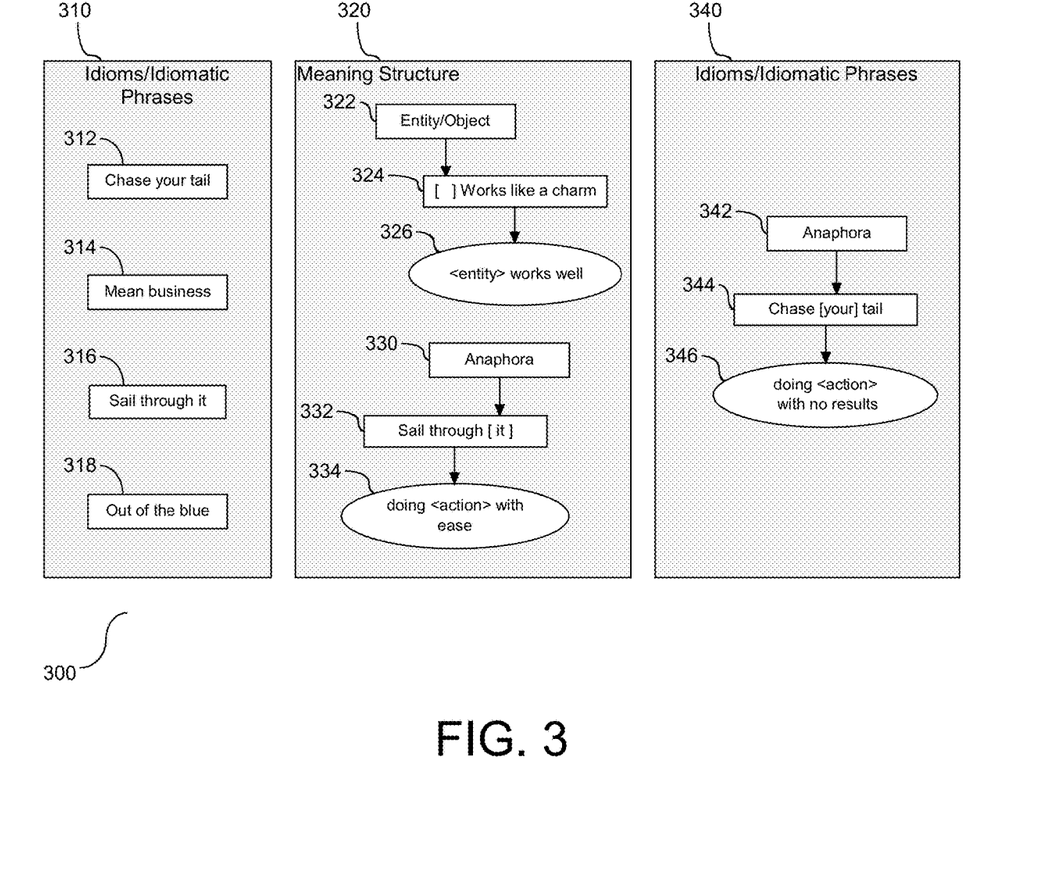
FIG. 3 depicts a block diagram illustrating the concept of processing idioms, and more specifically, natural language processing and interpretation of the idioms.

Referring to FIG. 3, a diagram (300) illustrates the concept of processing idioms, and more specifically, natural language processing and interpretation of the idioms. As shown, an idiom list (310) is provided with four example idioms (312)-(318). In the first sub-diagram (320), another example idiom "works like a charm" (324) is parsed to yield an understanding of the idiomatic structure. Specifically, the system understands that the entity or object (322) that immediately precedes the idiom (324) is the subject that is referred to as working like a charm. Furthermore, it is understood by the system that the phrase "works like a charm" (324) refers to the subject of the phrase as working well (326). "Works well" (326) is the meaning of the idiom and is thus applied to the identified entity or object (322) accordingly. When the idiom is saved as an entry in the corpus (160), the entry includes both the idiom as well as the meaning (326) and its grammatical structure.

Similarly, the idiom "sail through it" (316) is parsed in order to understand that the anaphora (330) "it" and the association between the idiom and the anaphora subject to evaluation. Employing the corpus (160), it is ascertained that the idiom (332) means doing an action with ease (334). As shown, it is understood by the system that the anaphora "it" (330) is the action that is done with ease. In order to provide further context to the idiom, the system tracks a conversation associated with the detected idiom in order to determine the action associated with the anaphora (330). In the second sub-diagram (340), the idiom "chase your tail" (312) is parsed by the system and embedded tools to obtain or ascertain an understanding. The system detects the anaphora (342) in the idiom as the word "your" and further ascertains that the anaphora (342) is the subject associated with the detected idiom. The system also draws the meaning of "doing an action with no results" (346) as the meaning of the idiom (344). However, in this example, it is noted that the anaphora (342) does not apply to the action mentioned in the meaning (346). Rather, the anaphora (342) refers to the entity or object that is doing the action with no results. Again in this example, in order to provide further context to the idiom, the system tracks the associated conversation in order to determine context, and more specifically to determine the subject with which the anaphora (330) is referring to as well as the action referred to in the meaning (346) of the idiom (344).

Figure 4:
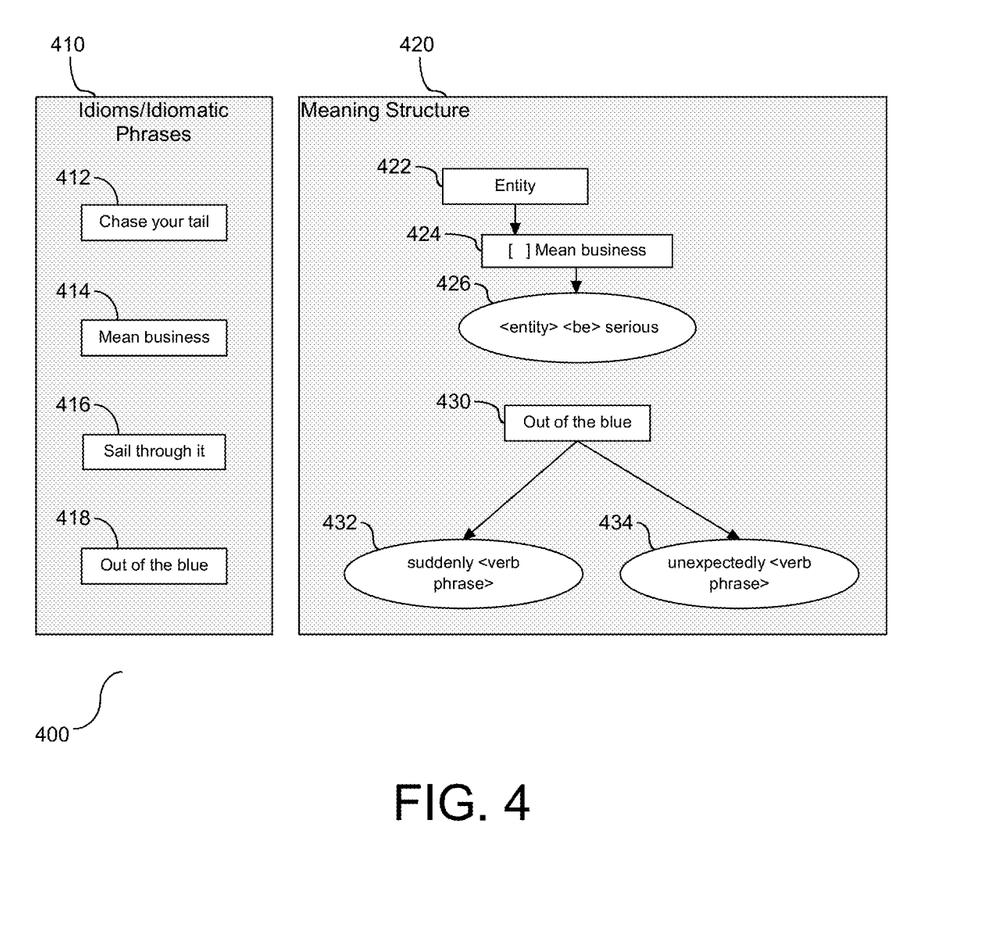
FIG. 4 depicts a block diagram illustrating the concept of processing idioms, and more specifically, natural language processing and interpretation of the idioms.

Referring to FIG. 4, a diagram (400) is provided to further illustrate natural language processing and interpretation of the idioms. An idiom list (410) is provided with the examples of idioms (412)-(418). Note, the examples (412)-(418) are the same as examples (312)-(318). The idiom "mean business" (414) is parsed to reveal that the entity (422) referred to as meaning business immediately precedes the idiomatic phrase. Through consultation with the corpus (160), and specifically entries present in the corpus, it is understood that the idiom of "meaning business" means that the subject of the phrase is serious (426). The entries that provide this meaning are referred to in FIG. 1 as the meaning entries (162) in the corpus (160). It is thus understood by the system that the idiom (424) signifies that the entity (422) that immediately precedes the idiom is serious.

Likewise, the idiom "out of the blue" (418) is similarly parsed. Particular to this example, a search of the corpus (160) and idiom entries (166) reveals that the idiom (430) has two possible meanings, including "suddenly" (432) and "unexpectedly" (434). As shown, the idiom and associated phrase is understood to be referring to an action happening suddenly (432) or the action happening unexpectedly (434). The system then must refer to phrases within the conversation associated with the idiom to provide further context and determine which of the two meanings (432) or (434) is clearly associated with the idiom (430).

Embodiments may be in the form of a computer system for use with an intelligent computer platform for providing a contextual analogy response. A processing unit is operatively coupled to memory and is in communication with an artificial intelligence platform. A tool, in communication with the processing unit, is activated by the artificial intelligence platform and employed to provide a contextual analogy response. More specifically, providing a contextual analogy response includes receiving a communication that includes an analogy. The analogy within the communication is identified and parsed into grammatical components. The analogy manager utilizes the grammatical components to identify a meaning of the analogy whereby the meaning of the analogy correlates to a response statement. In order to identify a meaning of the analogy, an idiom databank may be searched and an idiom entry within the idiom databank selected. The selection is made according to similarity of the idiom entry with the analogy whereby an idiom entry with more similarity is chosen over an idiom entry with lesser similarity. The idiom entry in the idiom databank has an associated meaning that correlates to the entry. The grammatical structure of the analogy is analyzed. To analyze the grammatical structure of the analogy, the analogy manager identifies an entity in the analogy, the idiomatic phrase, the anaphora terms within the idiomatic phrase, and the typical entity subject to the idiomatic phrase. A representation generator utilizes both the grammatical structure and grammatical components to construct an analogy representation. The representation generator constructs the analogy representation by populating a representation template with the identified entity, the meaning of the analogy, the identified anaphora terms, and the response statement. A response, which includes the response statement together with the analogy representation, is generated as output. The response statement may come before the analogy representation, such as a prefix statement, or after the analogy representation, such as a suffix statement.

Other embodiments include a tool, also in communication with the processing unit, but activated by the artificial intelligence platform and employed for conversational machine learning. More specifically, conversational machine learning includes the tool to parse an analogical phrase into grammatical subcomponents. The analogy manager identifies a meaning of the analogical phrase and generates a meaning structure. Generating of the meaning structure includes the analogy manager to identify an entity subcomponent and a typical type in the analogy. An idiomatic phrase is identified and a meaning of the idiomatic phrase is retrieved from a corpus. The generation of the meaning structure additionally includes identifying an anaphoric term in the idiomatic phrase, identifying a typical entity, and identifying a term type applied to the idiomatic phrase. The representation generator utilizes the generated meaning structure to construct an analogy representation. Constructing the analogy representation includes the representation generator to select the entity type acted upon. The representation generator further determines the idiomatic phrase, the meaning of the idiomatic phrase, the anaphora terms, and an associated set of reference types. A set of contextual phrase place holders are organized and a contextual response prefix is determined. The representation generator concludes the construction by generating a response that includes the entity type, the meaning for the idiomatic phrase, and the contextual response prefix. The contextual response prefix is a phrase that is sentiment-based on the outcome of the idiom. For example, a phrase may be tailored for sentiments such as good, bad, sad, mad, pleased, affirmative, negative, indifferent, apologetic, etc. Based on these sentiments, the contextual response prefix may read "That's great" for a good sentiment, "I'm sorry to hear" for a bad sentiment, "Pardon me" for apologetic sentiment, etc. The tool then saves the analogy representation to the corpus.

Another embodiment employs the tool to provide a contextual analogy response by having the tool denote an analogy phrase within a conversation. The analogy manager searches a database for analogies. The analogy manager also parses a set of sentences prior to the denoted analogy phrase and detects an anaphora within the analogy phrase. Detecting the anaphora within the analogy phrase includes the analogy manager to detect the anaphora by comparing the analogy phrase with entries in an anaphora database, search the parsed set of sentences for an entity represented by the anaphora, and denote the entity to the anaphora. The representation generator resolves the analogy meaning with respect to the set of sentences. In order to resolve the analogy meaning, the representation generator formulates a sentence with the detected anaphora and parses both the analogy phrase and the set of sentences into sub-components. A grammatical type of the sub-components is determined and the anaphora reference to the entity is matched. The representation generator assigns the entities to the corresponding anaphora and creates a solved analogy association. The representation generator retrieves analogy prefix responses. Retrieving analogy prefix responses includes a determination by the representation with respect to a meaning of the analogy and a type of response. The response is selected and a prefix is attached to the response. The representation generator then performs sentence and word matching. The representation generator generates a response and the tool then outputs the response.

In a further embodiment, a computer program device is provided for use with an intelligent computer platform for providing a contextual analogy response. The device has program code embodied therewith. The program code is executable by a processing unit to receive a communication that includes an analogy, and the executable process code to identify the analogy within the communication and parse the identified analogy into grammatical components. The program code utilizes the grammatical components to identify a meaning of the analogy whereby the meaning of the analogy correlates to a response statement. In order to identify a meaning of the analogy, the processing unit may search the corpus, such as an idiom databank, and select an idiom entry from the corpus. The selection is made according to similarity of the idiom entry with the analogy whereby an idiom entry with more similarity is selected, and an idiom entry with a relatively lesser degree of similarity is not selected.

The idiom entry in the idiom corpus has an associated meaning that correlates to the entry. The grammatical structure of the analogy is analyzed, with the analysis including identification of an entity in the analogy as well as the idiomatic phrase, the anaphora terms within the idiomatic phrase, and a typical entity subject to the idiomatic phrase. The grammatical structure is utilized together with the grammatical components to construct an analogy representation. Program code constructs the analogy representation by populating a representation template with the identified entity, the meaning of the analogy, the identified anaphora terms, and the response statement. The program code generates a response, which includes the response statement together with the analogy representation. The response statement may come before the analogy representation, such as a prefix statement, or after the analogy representation, such as a suffix statement.

In another embodiment, a computer program device is provided for use with the intelligent computer platform for conversational machine learning. The device has program code embodied therewith. The program code is executable by a processing unit to parse an analogical phrase into grammatical subcomponents. The program code identifies a meaning of the analogical phrase and generates a meaning structure. Generating the meaning structure includes identification of an entity sub-component and a typical type in the analogy. An idiomatic phrase is identified and a meaning of the idiomatic phrase is retrieved from the corpus. The generation of the meaning structure additionally includes identifying an anaphoric term in the idiomatic phrase, identifying a typical entity, and identifying a term type applied to the idiomatic phrase. The generated meaning structure is then used to construct an analogy representation. Constructing the analogy representation includes the program code to select the entity type acted upon. The program code further determines the idiomatic phrase, the meaning of the idiomatic phrase, the anaphora terms, and an associated set of reference types. A set of contextual phrase place holders are organized and a contextual response prefix is determined. The program code concludes the construction by generating a response that includes the entity type, the meaning for the idiomatic phrase, and the contextual response prefix. The contextual response prefix is a phrase that is sentiment-based on the outcome of the idiom. The program code saves the analogy representation in a database.

In another embodiment, a computer program device is provided for use with an intelligent computer platform for providing a contextual analogy response. The device has program code embodied therewith. The program code is executable by a processing unit to denote an analogy phrase within a conversation. The program code searches a database for analogies. The program code also parses a set of sentences prior to the denoted analogy phrase and detects an anaphora within the analogy phrase. Detecting the anaphora within the analogy phrase includes program code to detect the anaphora by comparing the analogy phrase with entries in an anaphora database or corpus, search the parsed set of sentences for an entity represented by the anaphora, and denote the entity to the anaphora. The program code resolves the analogy meaning with respect to the set of sentences. In order to resolve the analogy meaning, the program code formulates a sentence with the detected anaphora and parses both the analogy phrase and the set of sentences into sub-components. A grammatical type of the sub-components is determined and the anaphora reference to the entity is matched. The program code then assigns the entities to the corresponding anaphora and creates a solved analogy association. Analogy prefix responses are retrieved. Retrieving analogy prefix responses includes the program code unit to determine a meaning of the analogy and a type of response. A response is selected and a prefix is attached to the response. The program code then performs sentence and word matching, and the response is generated and subsequently outputted.

Figure 5:
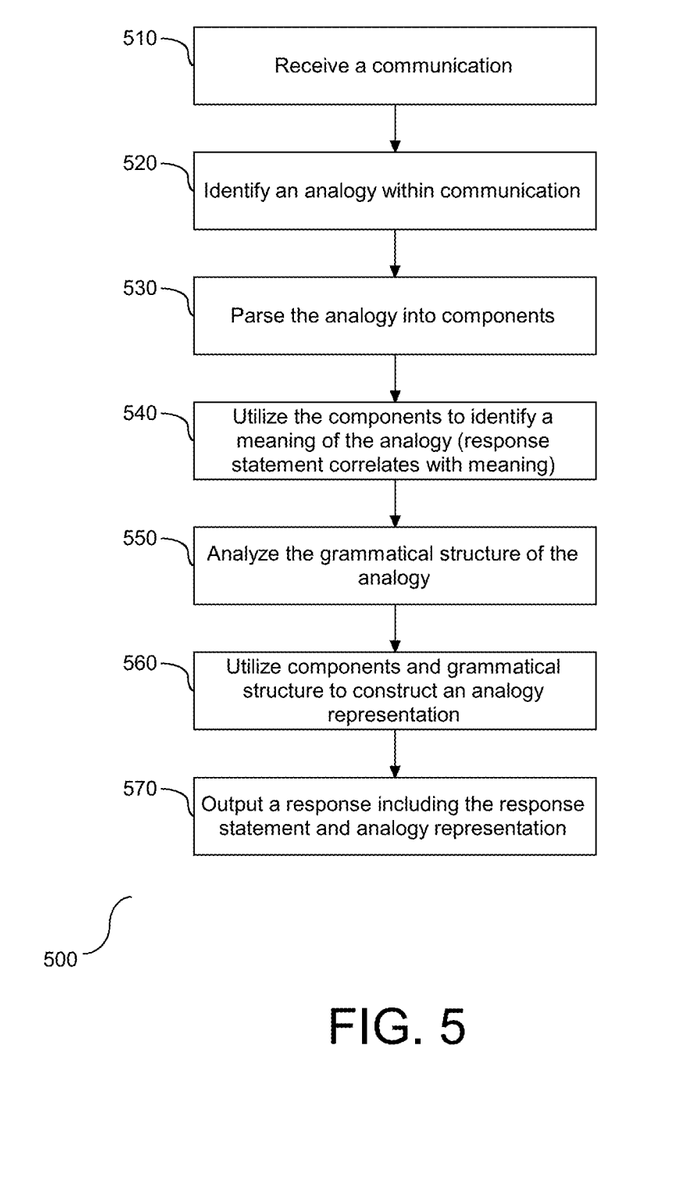
FIG. 5 depicts a flow chart illustrating the steps of evaluating an analogical phrase and providing a response.

Further embodiments may be in the form of methods provided for use by an intelligent computer platform for providing a contextual analogy response. Referring to FIG. 5, a flowchart (500) is provided illustrating a method that commences by receiving a communication that includes an analogy (510). The analogy within the communication is identified (520) and parsed into grammatical components (530). The grammatical components are utilized to identify a meaning of the analogy whereby the meaning of the analogy correlates to a response statement (540). In order to identify a meaning of the analogy, an idiom corpus or databank may be searched and an idiom entry within the idiom corpus or databank selected. In one embodiment, the selection is made according to similarity of the idiom entry with the analogy whereby an idiom entry with greater similarity is selected over an idiom entry with lesser similarity. The idiom entry in the idiom databank has an associated meaning that correlates to the entry. The grammatical structure of the analogy is analyzed (550), which in one embodiment includes identification of an entity in the analogy as well as the idiomatic phrase, the anaphora terms within the idiomatic phrase, and the typical entity subject to the idiomatic phrase. The entity is the subject of the anaphora, or in other words, the entity which the anaphora is referring to. The typical entity is different from the entity in that it refers to the category of noun or verb the entity falls under. In one embodiment, the analysis at (550) includes the analogy manager identifying the grammatical category of the typical entity and assigning a grammar classification to the typical entity. An example of an entity may be "Michael" and the corresponding typical entity will be "male". Likewise, the entity "book" will have the corresponding typical entity "object", and the entity "running" will have the corresponding typical entity "action". Accordingly, the entity identification may be in the form of an object or an action, and the typical entity identification may be in the form of the grammatical component, such as a noun for the entity object and an action or verb for the entity running.

An analogy representation is constructed utilizing the grammatical structure together with the grammatical components (560). In one embodiment, the analogy representation is constructed by populating a representation template with the identified entity, the meaning of the analogy, the identified anaphora terms, and the response statement. The response, including the response statement and the analogy representation, is generated as output (570). The response statement may come before the analogy representation, such as a prefix statement, or after the analogy representation, such as a suffix statement. Accordingly, the process shown herein demonstrates receipt and processing of a communication to generate an interpretation or translation of a detected analogy.

Figure 6:
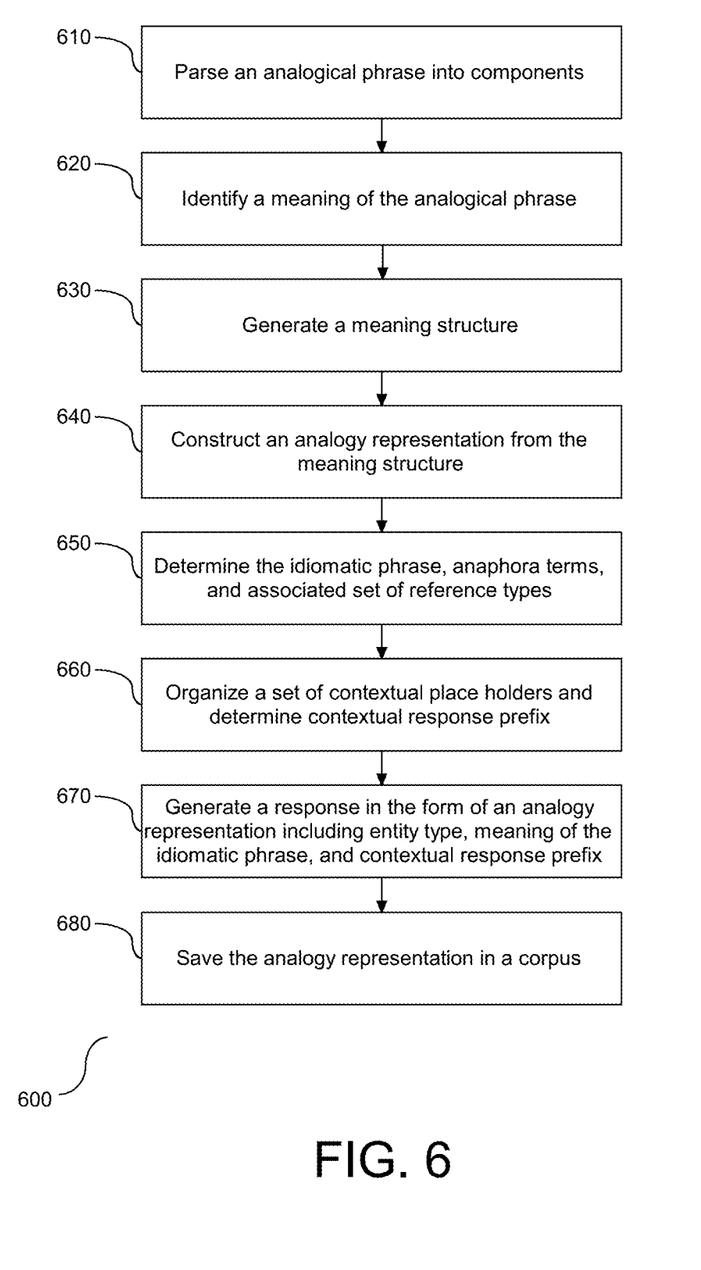
FIG. 6 depicts a flow chart illustrating the steps of evaluating an analogical phrase and saving a representation of the analogy in a database.

Referring to FIG. 6, a flowchart (600) is provided illustrating a method for use by an intelligent computer platform for conversational machine learning. The method commences with parsing an analogical phrase into grammatical sub-components (610). The meaning of the phrase is identified (620) and a meaning structure is generated (630). Generating of the meaning structure includes identifying an entity sub-component and a typical type in the analogy. An idiomatic phrase is identified and a meaning of the idiomatic phrase is retrieved from the corpus. The generation of the meaning structure additionally includes identifying an anaphoric term in the idiomatic phrase, identifying a typical entity, and identifying a term type applied to the idiomatic phrase.

The generated meaning structure is used to construct an analogy representation (640). Constructing the analogy representation includes selecting the entity type acted upon. The idiomatic phrase, the meaning of the idiomatic phrase, the anaphora terms, and an associated set of reference types are further determined (650). A set of contextual phrase place holders are organized and a contextual response prefix is determined (660). The construction is completed by generating a response in the form of an analogy representation that includes the entity type, the meaning for the idiomatic phrase, and the contextual response prefix (670). The contextual response prefix is a phrase that is sentiment-based on the outcome of the idiom. The analogy representation is then saved in the corpus (680).

Figure 7:
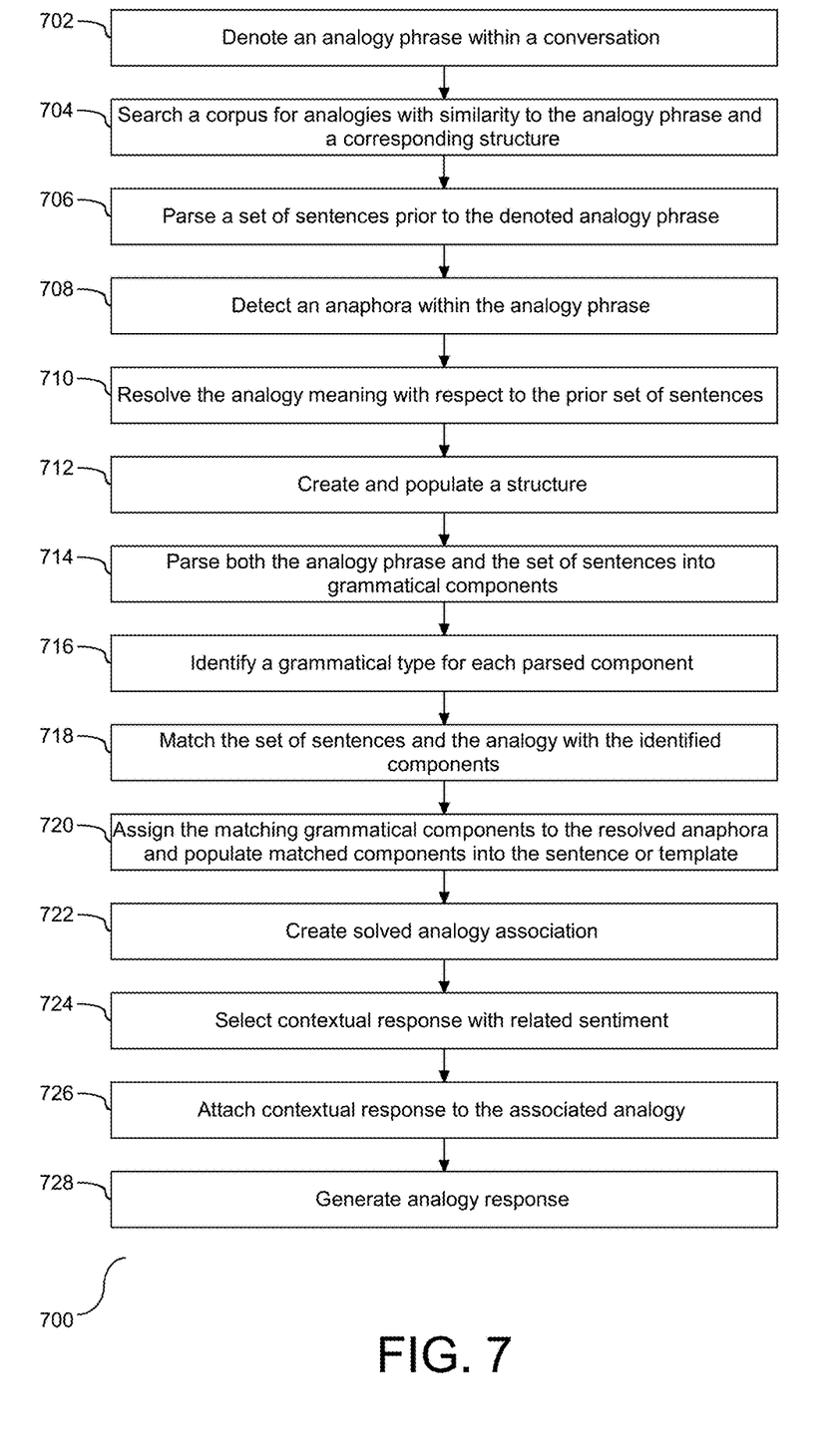
FIG. 7 depicts a flow chart illustrating the steps of evaluating an analogical phrase and providing a response.

Referring to FIG. 7, a flowchart (700) is provided illustrating yet another method provided for use by an intelligent computer platform for providing a contextual analogy response. The method commences with denoting an analogy phrase within a text based conversation (702). A corpus is searched for analogies (704) that are similar or the same as the analogy phrase. In one embodiment, the corpus search includes similarity of the structure of the analogy. Similarly, in one embodiment, the corpus search includes identification of a sentiment within the one or more analogies identified in the corpus based on the structural search. A set of sentences prior to the denoted analogy phrase are parsed (706) and an anaphora is detected within the analogy phrase (708), also referred to herein as sentence parsing. As shown herein, the analogy is detected within a series of communications. The sentence parsing at step (706) provides context to the detected analogy at step (708) based on content found in the series of communications. More specifically, the sentence parsing at step (706) employs content from the communications to identify or detect the basis of the detected anaphora so that the anaphora may be connected to the subject of the communication (710). Accordingly, the first aspect of the analogy resolution includes employing a set of communications that contains the analogy to resolve the anaphora present in the analogy.

Structure pertaining to the analogy is created and populated. As shown, a sentence is created with the detected anaphora and an action term from the analogy (712). In one embodiment, the created sentence is a template with the detected meaning of the anaphora populated therein. Similarly, in one embodiment, the created sentence of template uses the structure from the analogy employed in the search, or in one embodiment, from the structure of the analogy found in the corpus. Prior to completing the sentence or population of the template, both the detected analogy phrase and the set of sentences, e.g. communications, is parsed into grammatical components (714), e.g. nouns, pronouns, verbs, etc. A grammatical type is identified for each of the parsed components (716), and a match takes place between the set of sentences and the analogy employing the identified components (718). More specifically, the matching entails grammatical components parsed from the set of sentences with grammatical components parsed from the analogy phrase within the communications. The representation generator assigns the matching grammatical component(s) to the corresponding resolved anaphora and populates the matched component(s) into the sentence or template (720) thereby creates a solved analogy association (722).

The resolved analogy includes the solved analogy associated and a contextual response that is employed to explain the meaning of the solved analogy. The contextual response may be in the form of a prefix, a suffix, or both a prefix and a suffix. More specifically, the contextual response reflects the sentiment of the analogy phrase. In one embodiment, the sentiment is determined from the parsed components of the analogy phrase. Similarly, in one embodiment, the sentiment is obtained from a corresponding analogy in the data source. Following step (722), a contextual response that relates to the sentiment of the analogy phrase is selected from a corpus or data store (724), and attached to the created analogy associated (726). In the embodiment of a prefix, the contextual response is attached to the analogy association in a manner that precedes the analogy, which in one embodiment is immediately preceding the analogy association. Similarly, in the embodiment of a suffix, the contextual response is attached to the analogy association in a manner that follows the analogy, which in one embodiment is immediately following the analogy association. The analogy response, including the solved analogy associated and in one embodiment, the contextual response, is generated and then communicated as output (728).

Example 1

A set of communications are evaluated and the following sentence is found in the communications "John finished his work, he sailed through it." The process shown and described in FIG. 7, identifies this example sentence as containing an analogy. The first part of the sentence or the set of communication is employed to detect and resolved the anaphora, which in this example is John. The action term or phrase "sailed" is identified. The solved analogy is determined as "he finished his work with ease". A contextual response in the form of a prefix is retrieved and attached to the solved analogy with the complete response being "That's great! He finished his work with ease."

Example 2

A set of communications are evaluated and the following sentence is found in the communications "I was cleaning the house, and basically was chasing my tail." The process shown and described in FIG. 7, identifies this example sentence as containing an analogy. The first part of the sentence or the set of communication is employed to detect and resolved the anaphora. The action term or phrase "cleaning" is identified. The solved analogy is determined as "your cleaning had no results". A contextual response in the form of a prefix is retrieved and attached to the solved analogy with the complete response being "Sorry to hear. Your cleaning had no results."

It will be appreciated that there is disclosed herein a system, method, apparatus, and computer program product for evaluating natural language input, detecting an analogy in a communication, and resolving the detected analogy.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection of analogies and their meanings to determine outcomes, including an extended characteristic of key items in the analogical patterns.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
a processing unit operatively coupled to memory;
an artificial intelligence platform in communication with the processing unit, the artificial intelligence platform to provide a contextual analogy response;
the artificial intelligence platform comprising:
an analogy manager to:
search a corpus for one or more analogies with similarity to the denoted analogy phrase;
parse a set of sentences prior to the denoted analogy phrase to detect an anaphora within the analogy phrase;
resolve the detected anaphora in the analogy phrase with respect to the prior set of sentences;
detect a meaning of the analogy phrase;
parse both the analogy phrase and the set of sentences into grammatical components; and
identify a grammatical type for each parsed component; and
a representation generator, in communication with the analogy manager, the representation generator to:
match the set of sentences and the analogy phrase with the identified components, wherein the matching entails grammatical components parsed from the set of sentences with grammatical components parsed from the analogy phrase within the communication;
create a sentence, wherein the created sentence is a template, the template includes the detected anaphora and the detected meaning of the analogy phrase;
assign the matching grammatical components to the resolved anaphora and populate the matched components into the created sentence, wherein the assigning and populating of the components creates a solved analogy association;
select a contextual response from the corpus that has a related sentiment to the analogy phrase and the resolved anaphora;
attach the contextual response to the solved analogy association; and
generate the contextual analogy response as output.

2. The computer system of claim 1, wherein the corpus search includes the analogy manager to identify a sentiment within the analogy based on a structural search.

3. The computer system of claim 1, wherein the sentiment is determined from the parsed components of the analogy phrase.

4. The computer system of claim 1, further comprising the analogy manager to determine the contextual response is a prefix and the representation generator to attach the contextual response to the analogy association preceding the analogy.

5. The computer system of claim 1, further comprising the analogy manager to determine the contextual response is a suffix and the representation generator to attach the contextual response to the analogy association following the analogy.

6. A computer program product for providing a contextual analogy response, the computer program product comprising a computer readable storage device having program code embodied therewith, the program code executable by a processing unit to:
  denote an analogy phrase within a communication;
  search a corpus for one or more analogies with similarity to the denoted analogy phrase;
  parse a set of sentences prior to the denoted analogy phrase to detect an anaphora within the analogy phrase;
  resolve the detected anaphora in the analogy phrase with respect to the prior set of sentences;
  detect a meaning of the analogy phrase;
  parse both the analogy phrase and the set of sentences into grammatical components;
  identify a grammatical type for each parsed component;
  create a sentence, wherein the created sentence is a template, the template includes the detected anaphora and the detected meaning of the analogy phrase;
  match the set of sentences and the analogy phrase with the identified components, wherein the matching entails grammatical components parsed from the set of sentences with grammatical components parsed from the analogy phrase within the communication;
  assign the matching grammatical components to the resolved anaphora and populate the matched components into the created sentence, wherein the assigning and populating of the components creates a solved analogy association;
  select a contextual response from the corpus that has a related sentiment to the analogy phrase and the resolved anaphora;
  attach the contextual response to the solved analogy association; and
  generate the contextual analogy response as output.

7. The computer program product of claim 6, wherein the corpus search includes identifying a sentiment within the analogy based on a structural search.

8. The computer program product of claim 6, wherein the sentiment is determined from the parsed components of the analogy phrase.

9. The computer program product of claim 6, further comprising determining the contextual response is a prefix and attaching the contextual response to the analogy association preceding the analogy.

10. The computer program product of claim 6, further comprising determining the contextual response is a suffix and attaching the contextual response to the analogy association following the analogy.

11. A method for providing a contextual analogy response:
  denoting an analogy phrase within a communication;
  searching a corpus for one or more analogies with similarity to the denoted analogy phrase;
  parsing a set of sentences prior to the denoted analogy phrase to detect an anaphora within the analogy phrase;
  resolving the detected anaphora in the analogy phrase with respect to the prior set of sentences;
  detecting a meaning of the analogy phrase;
  parsing both the analogy phrase and the set of sentences into grammatical components;
  identifying a grammatical type for each parsed component;
  creating a sentence, wherein the created sentence is a template, the template includes the detected anaphora and the detected meaning of the analogy phrase;
  matching the set of sentences and the analogy phrase with the identified components, wherein the matching entails grammatical components parsed from the set of sentences with grammatical components parsed from the analogy phrase within the communication;
  assigning the matching grammatical components to the resolved anaphora and populating the matched components into the created sentence, wherein the assigning and populating of the components creates a solved analogy association;
  selecting a contextual response from the corpus that has a related sentiment to the analogy phrase and the resolved anaphora;
  attaching the contextual response to the solved analogy association; and
  generating the contextual analogy response as output.

12. The method of claim 11, wherein the corpus search includes identifying a sentiment within the analogy based on a structural search.

13. The method of claim 11, wherein the sentiment is determined from the parsed components of the analogy phrase.

14. The method of claim 11, further comprising determining the contextual response is a prefix and attaching the contextual response to the analogy association preceding the analogy.

15. The method of claim 11, further comprising determining the contextual response is a suffix and attaching the contextual response to the analogy association following the analogy.

* * * * *